United States Patent
Kim et al.

(10) Patent No.: US 11,592,876 B2
(45) Date of Patent: Feb. 28, 2023

(54) ELECTRONIC DEVICE

(71) Applicant: Samsung Display Co., Ltd., Yongin-si (KR)

(72) Inventors: Yunjae Kim, Cheonan-si (KR); Minseop Kim, Cheonan-si (KR); Bugyoon Yoo, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/392,779

(22) Filed: Aug. 3, 2021

(65) Prior Publication Data

US 2022/0129040 A1    Apr. 28, 2022

(30) Foreign Application Priority Data

Oct. 23, 2020  (KR) .......................... 10-2020-0138269

(51) Int. Cl.
  *G06F 1/16*  (2006.01)
  *G06F 1/20*  (2006.01)
  *H04M 1/02*  (2006.01)

(52) U.S. Cl.
  CPC .......... *G06F 1/1656* (2013.01); *G06F 1/1616* (2013.01); *G06F 1/1652* (2013.01); *G06F 1/206* (2013.01); *H04M 1/0268* (2013.01)

(58) Field of Classification Search
  CPC combination set(s) only.
  See application file for complete search history.

(56) References Cited

U.S. PATENT DOCUMENTS

| 10,512,184 | B2 |    | 12/2019 | Cho et al. |
| 10,966,329 | B2 | *  | 3/2021  | Park ................... H01L 51/5237 |
| 11,108,014 | B2 | *  | 8/2021  | Ha .......................... B32B 27/08 |
| 11,243,564 | B2 | *  | 2/2022  | Kim ...................... G06F 1/1641 |
| 11,284,176 | B2 | *  | 3/2022  | Noh .................. G02F 1/133345 |
| 11,300,996 | B2 | *  | 4/2022  | Kim ...................... G06F 1/1681 |
| 11,425,833 | B2 | *  | 8/2022  | Kim ..................... H04M 1/0216 |
| 2020/0319672 | A1 | * | 10/2020 | Kim ...................... G06F 1/1656 |
| 2020/0351393 | A1 | * | 11/2020 | Kang ................. H04M 1/0216 |
| 2021/0029841 | A1 | * | 1/2021  | Kim ..................... H05K 5/0247 |
| 2021/0105894 | A1 | * | 4/2021  | Oh ........................ G06F 1/1637 |
| 2021/0116964 | A1 | * | 4/2021  | Moon .................. H05K 5/0226 |
| 2021/0135152 | A1 | * | 5/2021  | Jung ..................... H01L 51/529 |

(Continued)

FOREIGN PATENT DOCUMENTS

| KR | 10-2018-0118332 | 10/2018 |
| KR | 10-2020-0070904 | 6/2020 |

*Primary Examiner* — Lisa Lea-Edmonds
(74) *Attorney, Agent, or Firm* — Kile Park Reed & Houtteman PLLC

(57) ABSTRACT

An electronic device includes a display panel including a first panel area, a bending area, and a second panel area, a support layer disposed under the first panel area of the display panel, a set bracket disposed under the support layer, a first waterproofing tape disposed between the support layer and the set bracket, the first waterproofing tape being attached to the set bracket, and a second waterproofing tape attached to the set bracket. The bending area may be bendable, the second panel area may be disposed under the first panel area, the first waterproofing tape may be spaced from the second panel area in a thickness direction of the display panel, and the second waterproofing tape may overlap the second panel area.

21 Claims, 12 Drawing Sheets

(56) References Cited

U.S. PATENT DOCUMENTS

| | | | |
|---|---|---|---|
| 2021/0219439 A1* | 7/2021 | Park | H05K 5/0017 |
| 2021/0255666 A1* | 8/2021 | Kim | G06F 1/1681 |
| 2021/0286407 A1* | 9/2021 | Kim | G06F 1/1641 |
| 2021/0320275 A1* | 10/2021 | Cho | G02F 1/133331 |
| 2022/0048813 A1* | 2/2022 | Kim | H05K 1/0306 |
| 2022/0103672 A1* | 3/2022 | Jung | H04M 1/0216 |
| 2022/0129040 A1* | 4/2022 | Kim | G06F 1/206 |

* cited by examiner

ELECTRONIC DEVICE

CROSS-REFERENCE TO RELATED APPLICATION(S)

This application claims priority to and benefits of Korean Patent Application No. 10-2020-0138269 under 35 U.S.C. § 119, filed on Oct. 23, 2020 in the Korean Intellectual Property Office, the entire contents of which are incorporated herein by reference.

BACKGROUND

1. Technical Field

Embodiments of the disclosure described herein relate to an electronic device with improved product reliability.

2. Description of the Related Art

An electronic device provides information to a user by displaying various images on a display screen. In general, the electronic device displays the information within an allocated screen. Recently, a flexible electronic device including a foldable flexible display panel has been developed. Unlike a rigid electronic device, the flexible electronic device may be folded, rolled, or bent. The flexible electronic device whose shape is changeable in various ways is portable without being restricted to an existing screen size, and thus user convenience may be improved.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments of the disclosure provide an electronic device with improved waterproofing performance.

According to an embodiment, an electronic device may include a display panel including a first panel area, a bending area, and a second panel area, a support layer disposed under the first panel area of the display panel, a set bracket disposed under the support layer, a first waterproofing tape disposed between the support layer and the set bracket, the first waterproofing tape being attached to the set bracket, and a second waterproofing tape attached to the set bracket. The bending area may be bent, the second panel area may be disposed under the first panel area, the first waterproofing tape may be spaced from the second panel area in a thickness direction of the display panel, and the second waterproofing tape may overlap the second panel area.

The first waterproofing tape may have a thickness greater than a thickness of the second waterproofing tape.

The bending area may be bent with respect to a bending axis extending in a first direction, and the second waterproofing tape may be extended in the first direction.

The first waterproofing tape may include a first portion extending in a first direction, a second portion extending from an end of the first portion in a second direction intersecting the first direction, and a third portion extending from another end of the first portion in the second direction, and the second panel area may be disposed in a region surrounded by the first portion, the second portion, and the third portion.

The electronic device may further include a first gasket disposed between the second portion of the first waterproofing tape and the second waterproofing tape, and a second gasket disposed between the third portion of the first waterproofing tape and the second waterproofing tape.

The second panel area may include an edge adjacent to the first gasket and the second gasket, and the edge of the second panel area may protrude more than an edge of the second waterproofing tape.

A chip cover layer may have an edge between the second panel area and the second waterproofing tape, and the edge of the chip cover layer may protrude more than the edge of the second waterproofing tape and may protrude less than the edge of the second panel area.

The electronic device may further include a spacer disposed between the support layer and the second panel area, wherein the spacer may have an edge adjacent to the first gasket and the second gasket, and the edge of the spacer may protrude more than the edge of the second panel area and the edge of the second waterproofing tape.

The spacer may have waterproofing properties.

The spacer may include a closed-cell form.

The electronic device may further include a cover layer disposed under the support layer, and a heat dissipation layer disposed under the cover layer, wherein the first waterproofing tape may be attached to the heat dissipation layer The cover layer may have an edge adjacent to the first gasket and the second gasket, the edge of the cover layer may protrude more than an edge of the heat dissipation layer, and the edge of the heat dissipation layer may protrude more than an edge of the first waterproofing tape.

Each of the first gasket and the second gasket may be spaced from an edge of the support layer surrounded by the bending area.

Each of the first gasket and the second gasket may have a width increasing farther from the support layer.

The first panel area may include a folding area, a first unfolding area, and a second unfolding area, wherein the folding area is disposed between the first unfolding area and the second unfolding area, the folding area may be foldable, the first waterproofing tape and the second waterproofing tape may overlap the second unfolding area, and openings in the support layer may be defined in a region overlapping the folding area of the support layer.

At least one of the first waterproofing tape and the second waterproofing tape may include a closed-cell foam.

According to an embodiment, an electronic device may include a display panel, a circuit film disposed on the display panel, a first waterproofing tape disposed on the display panel and adjacent to the circuit film, a second waterproofing tape disposed on the display panel and adjacent to the circuit film, and a gasket disposed between the first waterproofing tape and the second waterproofing tape.

The display panel may include a first panel area, a bending area extending from the first panel area and bending toward a surface of the first panel area, and a second panel area extending from the bending area and disposed under the first panel area, the circuit film may be attached to the second panel area, and the second waterproofing tape may overlap the second panel area.

The electronic device may further include a support layer disposed under the first panel area, a spacer disposed under the support layer, a panel protective layer disposed under the spacer, and a chip cover layer disposed under the panel protective layer, wherein the second panel area may be disposed between the chip cover layer and the panel protective layer, and the second waterproofing tape may be attached to the chip cover layer. A first distance may be defined between an edge of the spacer that contacts the gasket and the first waterproofing tape, a second distance may be defined between an edge of the panel protective layer that contacts the gasket and the first waterproofing tape, and a third distance may be defined between an edge of the chip cover layer that contacts the gasket and the first waterproofing tape. The first distance may be smaller than the second and third distances, and the second distance may be smaller than the third distance.

At least one of the spacer, the first waterproofing tape, and the second waterproofing tape may include a closed-cell foam.

The display panel may include a folding area, a first unfolding area, and a second unfolding area, wherein the folding area is disposed between the first unfolding area and the second unfolding area, the folding area may be foldable, and the first waterproofing tape, the second waterproofing tape, and the gasket may overlap the second unfolding area.

BRIEF DESCRIPTION OF THE FIGURES

The above and other aspects and features of the disclosure will become apparent by describing in detail embodiments thereof with reference to the accompanying drawings.

DETAILED DESCRIPTION OF THE EMBODIMENTS

Figure 1A:
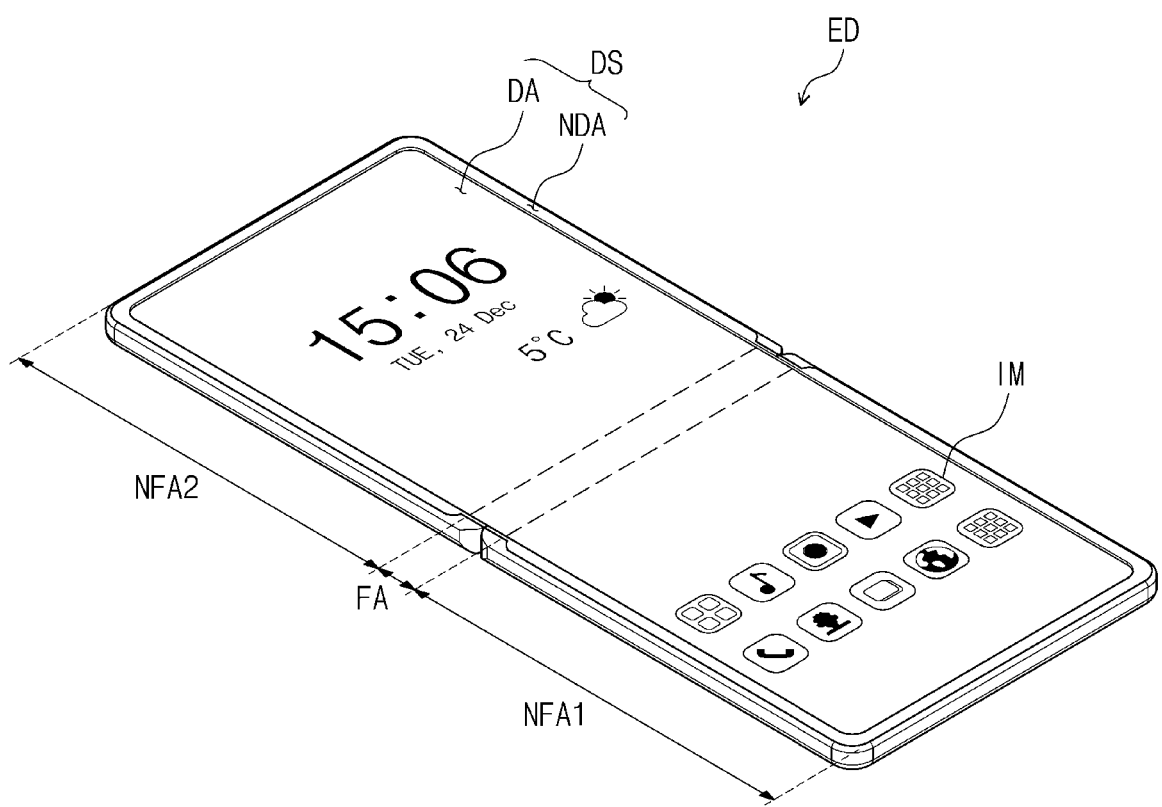
FIGS. 1A and 1B are schematic perspective views of an electronic device according to an embodiment.

In the disclosure, when a component (or area, layer, part, or the like) is referred to as being "on," "connected," or "coupled" to another component, it should be understood that the former may be directly on, connected or coupled to the latter, and also may be on, connected or coupled to the latter via a third intervening component.

Like reference numerals refer to like components. Also, in the figures, the thickness, rate, and dimension of components may be exaggerated for effectiveness of description of technical contents.

The term "and/or" includes one of the associated listed items or all combinations of two or more of the associated listed items. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

Terms like "first" and "second" are used to describe various components, but the components are not limited to these terms. These terms are used only to differentiate a component from another component. For example, the first component may be designated as the second component, and vice versa, without departing from the spirit or scope of the disclosure. A singular form, unless otherwise indicated, may include a plural form (and vice versa).

Also, terms "under," "beneath," "on," and "above" are used to describe relationship between components illustrated in a drawing. These terms are relative concepts and may be described with reference to a direction indicated in the drawing.

Unless otherwise defined, all terms (including technical and scientific terms) used herein have the same meaning as commonly understood by one of ordinary skill in the art to which the disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

The meaning of "include," "comprise," "has," "have," "including," "comprising," and "having", specifies a property, a fixed number, a step, a process, a component, a component and/or a combination thereof but does not exclude other properties, fixed numbers, steps, processes, components, components and/or combinations thereof.

The terms "overlap" or "overlapped" mean that a first object may be above or below or to a side of a second object, and vice versa. Additionally, the term "overlap" may include layer, stack, face or facing, extending over, extending under, covering, or partly covering or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

When an element is described as "not overlapping" or "to not overlap" another element, this may include that the elements are spaced apart from each other, offset from each other, or set aside from each other or any other suitable term as would be appreciated and understood by those of ordinary skill in the art.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Hereinafter, embodiments of the disclosure will be described with reference to the drawings.

Figure 1B:
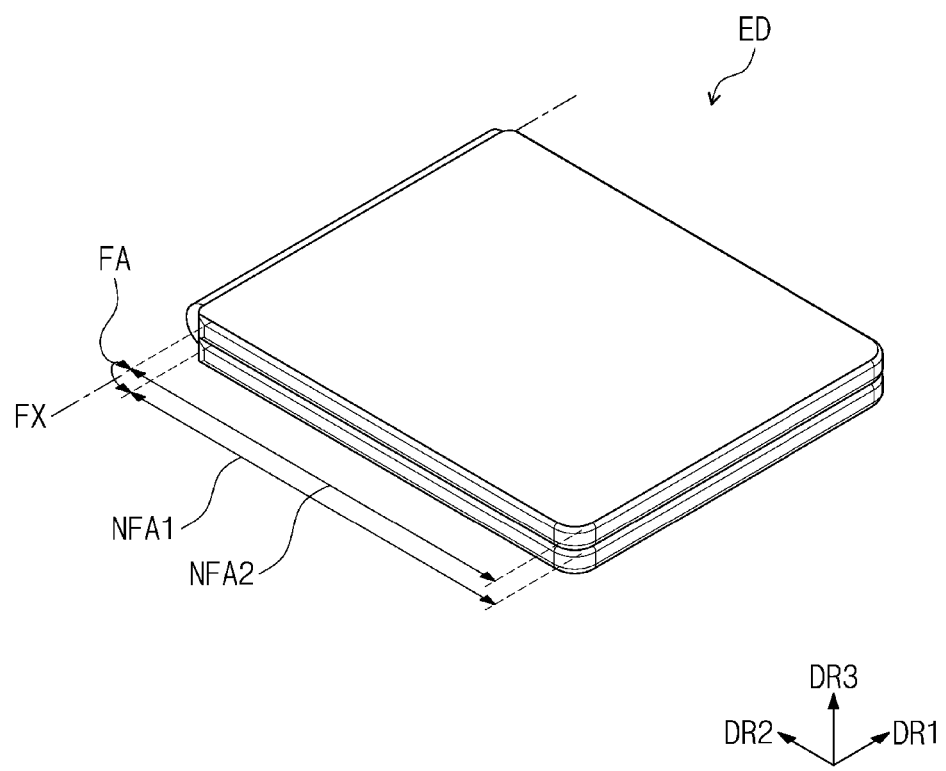

FIGS. 1A and 1B are schematic perspective views of an electronic device ED according to an embodiment. FIG. 1A illustrates an unfolded state (or an open state) of the electronic device ED, and FIG. 1B illustrates a folded state of the electronic device ED.

Referring to FIGS. 1A and 1B, the electronic device ED according to an embodiment may include a display surface DS which may be defined by a first direction DR1 and a second direction DR2 intersecting the first direction DR1. The electronic device ED may provide an image IM to a user through the display surface DS.

The display surface DS may include a display area DA and a non-display area NDA around the display area DA. The display area DA may display the image IM, and the non-display area NDA may not display the image IM. The non-display area NDA may surround the display area DA. However, the disclosure is not limited thereto, and a shape of the display area DA and a shape of the non-display area NDA may be modified.

Hereinafter, a direction substantially perpendicular to a plane defined by the first direction DR1 and the second direction DR2 may be defined as a third direction DR3. Also, in the disclosure, the expression "in a plan view" may be defined as a state viewed in the third direction DR3. Hereinafter, the first to third directions DR1, DR2, and DR3 and directions indicated by first to third direction axes may refer to same reference numerals.

The electronic device ED may include a folding area FA and unfolding areas NFA1 and NFA2. The unfolding areas NFA1 and NFA2 may include the first unfolding area NFA1 and the second unfolding area NFA2. In the second direction DR2, the folding area FA may be disposed between the first unfolding area NFA1 and the second unfolding area NFA2.

As illustrated in FIG. 1B, the folding area FA may be folded around a folding axis FX parallel to the first direction DR1. The folding area FA may have a curvature and a radius of curvature. The first unfolding area NFA1 and the second unfolding area NFA2 may face each other, and the electronic device ED may be in-folded so that the display surface DS may not be exposed to the outside.

In an embodiment, the electronic device ED may be out-folded so that the display surface DS may be exposed to the outside. In an embodiment, the electronic device ED may be configured to alternately repeat an in-folding operation or an out-folding operation from an unfolding operation, but the disclosure is not limited thereto. In an embodiment, the electronic device ED may be configured to select one of the unfolding operation, the in-folding operation, and the out-folding operation.

Figure 2:
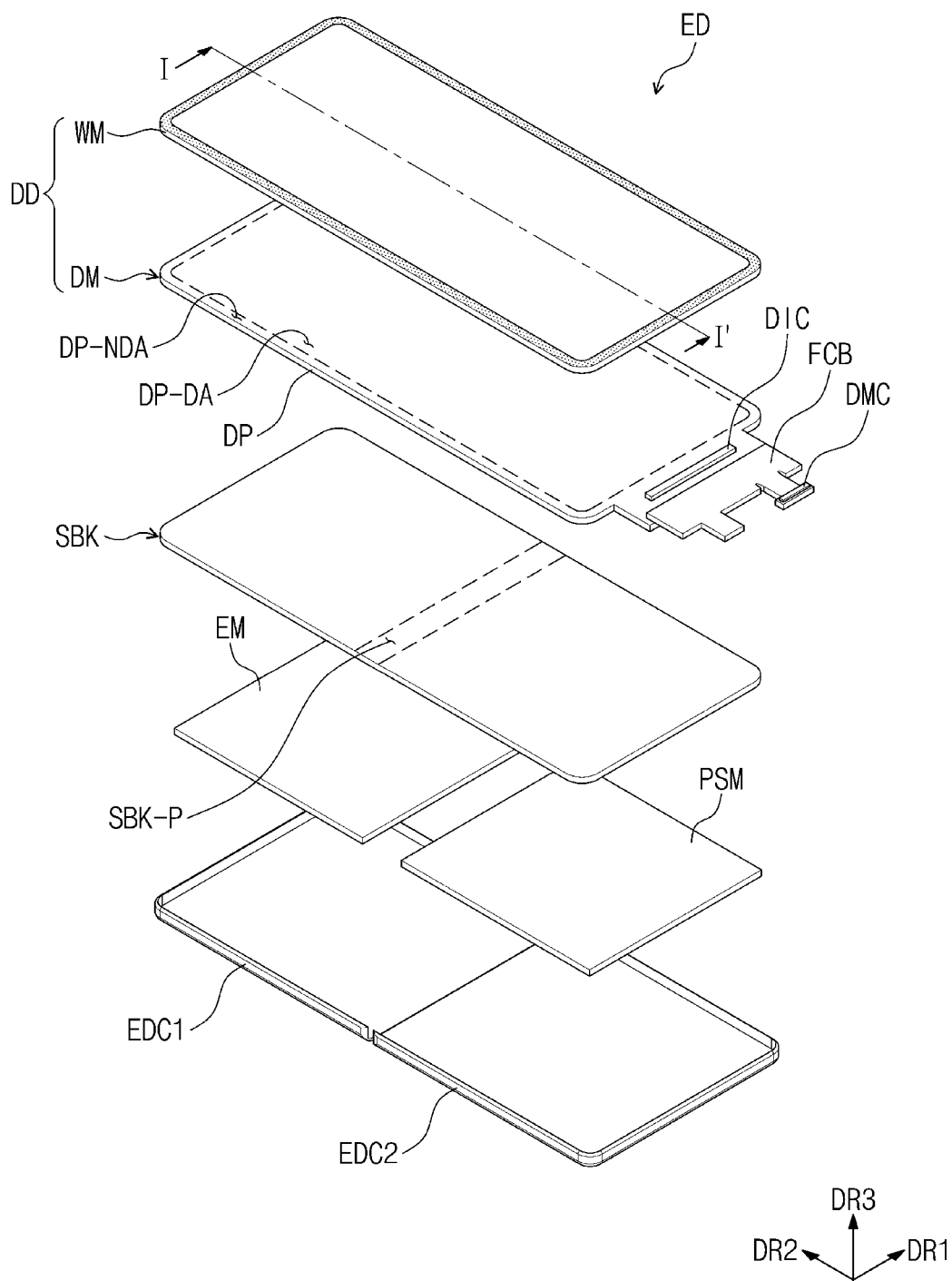
FIG. 2 is an exploded schematic perspective view of an electronic device according to an embodiment.

FIG. 2 is an exploded schematic perspective view of an electronic device according to an embodiment.

Referring to FIG. 2, the electronic device ED may include a display device DD, a set bracket SBK, an electronic module EM, a power module PSM, and cases EDC1 and EDC2. Although not shown in FIG. 2, the electronic device ED may further include a mechanical structure for controlling the folding operation of the display device DD.

The display device DD may generate an image and detect an external input. The display device DD may include a window module WM and a display module DM. The window module WM may provide a front surface of the electronic device ED.

The display module DM may include a display panel DP. FIG. 2 illustrates that the display module DM is identical to the display panel DP, but the display module DM may be a stacked structure in which components are stacked on each other. A detailed description of the stacked structure of the display module DM will be described below.

The display module DM may include the display panel DP. The display panel DP may include a display area DP-DA corresponding to the display area DA (refer to FIG. 1A) and a non-display area DP-NDA corresponding to the non-display area NDA (refer to FIG. 1A) of the electronic device ED. In the disclosure, the phrase "an area/portion corresponds to another area/portion" may mean that the areas/portions overlap each other, and is not limited to an interpretation where the areas/portions have a same size.

The display module DM may include a driving chip DIC disposed on the non-display area DP-NDA. The display module DM may further include a circuit film FCB electrically connected to the non-display area DP-NDA. The circuit film FCB may be flexible.

The driving chip DIC may include driving elements for driving pixels of the display panel DP, for example, a data driving circuit. FIG. 2 illustrates a structure in which the driving chip DIC is mounted on the display panel DP, but the disclosure is not limited thereto. For example, the driving chip DIC may be mounted on the circuit film FCB.

A connector DMC may be mounted on the circuit film FCB. The connector DMC may be electrically connected to a main controller to be described below.

The set bracket SBK may be disposed under the display device DD. The display device DD may be attached to the set bracket SBK. A part SBK-P, of the set bracket SBK, corresponding to the folding area FA (refer to FIG. 1A) may be formed of a material having elasticity. Similar to the cases EDC1 and EDC2, the set bracket SBK may be provided in two separate pieces.

The electronic module EM and the power module PSM may be disposed under the set bracket SBK. The electronic module EM may include at least the main controller. The electronic module EM may include a wireless communication module, a camera module, a proximity sensor module, an image input module, an audio input module, an audio output module, a memory, and an external interface module. The electronic module EM may be electrically connected to the power module PSM.

The main controller may control an overall operation of the electronic device ED. For example, the main controller may activate or deactivate the display device DD in response to a user input. The main controller may control operations of the display device DD and other modules. The main controller may include at least one microprocessor.

The cases EDC1 and EDC2 may accommodate the display module DM, the set bracket SBK, the electronic module EM, and the power module PSM. Although FIG. 2 illustrates, as an example, the two cases EDC1 and EDC2 separated from each other, the disclosure is not limited thereto. Although not shown in FIG. 2, the electronic device ED may further include a hinge structure for connecting the two cases EDC1 and EDC2. The cases EDC1 and EDC2 may be combined with the window module WM. The cases EDC1 and EDC2 may protect components accommodated in the cases EDC1 and EDC2, such as the display module DM, the electronic module EM, and the power module PSM.

Figure 3:
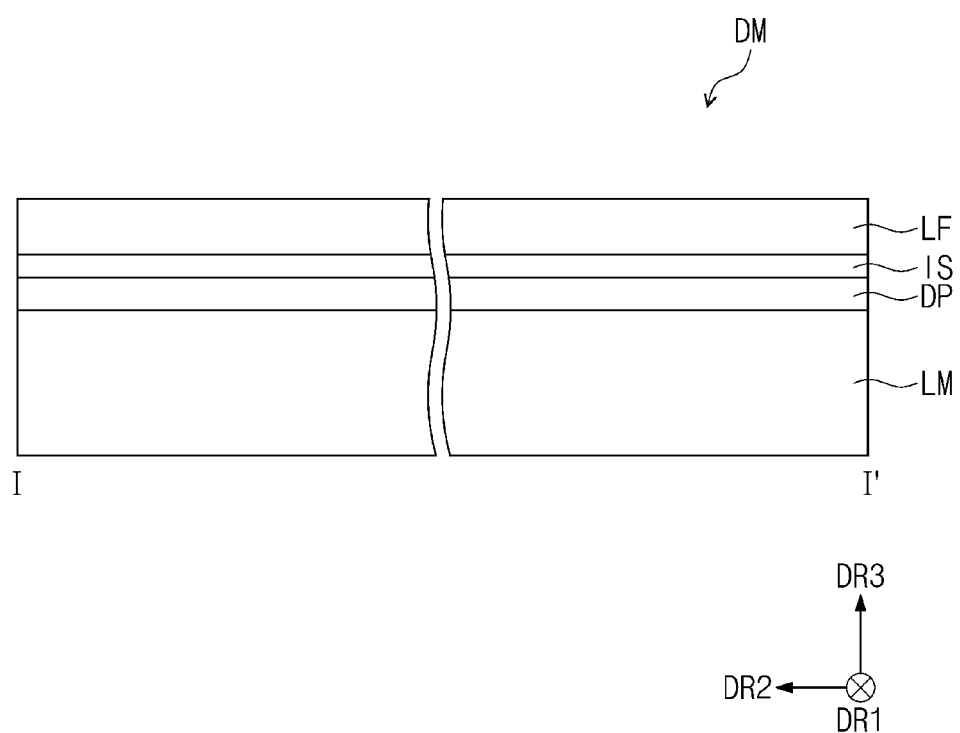
FIG. 3 is a schematic cross-sectional view of a display module according to an embodiment.

FIG. 3 is a schematic cross-sectional view of a display module according to an embodiment.

Referring to FIG. 3, the display module DM may include the display panel DP, an input sensor IS disposed on the display panel DP, an optical film LF disposed on the input sensor IS, and a lower member LM disposed under the display panel DP. Adhesive layers may be disposed between the components, as needed.

The display panel DP may include a base layer, a circuit element layer disposed on the base layer, a display element layer disposed on the circuit element layer, and a thin film encapsulation layer disposed on the display element layer. The base layer may include a plastic film. For example, the base layer may include polyimide. Substantially, a shape of the base layer in a plan view may be the same as that of the display panel DP in a plan view shown in FIG. 4 to be described below.

The circuit element layer may include an organic layer, an inorganic layer, a semiconductor pattern, a conductive pattern, and a signal line. The organic layer, the inorganic layer, a semiconductor layer, and a conductive layer may be formed on the base layer by coating and vapor deposition. Thereafter, the organic layer, the inorganic layer, the semiconductor layer, and the conductive layer may be selectively patterned through photolithography processes, and thus the semiconductor pattern, the conductive pattern, and the signal line may be formed.

The semiconductor pattern, the conductive pattern, and the signal line may form pixel driving circuits and signal lines SL1-SLm, DL1-DLn, EL1-ELm, CSL1, CSL2, and PL of pixels PX shown in FIG. 4 to be described below. The pixel driving circuit may include at least one transistor.

The display element layer may include light emitting elements of the pixels PX shown in FIG. 4 to be described below. The light emitting elements may be electrically connected to the at least one transistor. The thin film encapsulation layer may be disposed on the display element layer to seal the display element layer. The thin film encapsulation layer may include an inorganic layer, an organic layer, and an inorganic layer sequentially stacked on each other. A stacked structure of the thin film encapsulation layer is not limited thereto.

The input sensor IS may include sensing electrodes (not shown) for sensing an external input, trace lines (not shown) electrically connected to the sensing electrodes, respectively, and an inorganic layer and/or an organic layer for insulating/protecting the sensing electrodes or the trace lines. The input sensor IS may be a capacitive sensor, but the disclosure is not limited thereto.

The input sensor IS may be directly formed on the thin film encapsulation layer by a continuous process in manufacturing the display panel DP. In the disclosure, the display panel DP integrated with the input sensor IS may be defined as an electronic panel. However, the disclosure is not limited thereto, and the input sensor IS may be manufactured as a panel separate from the display panel DP and may be attached to the display panel DP by an adhesive layer.

Figure 4:
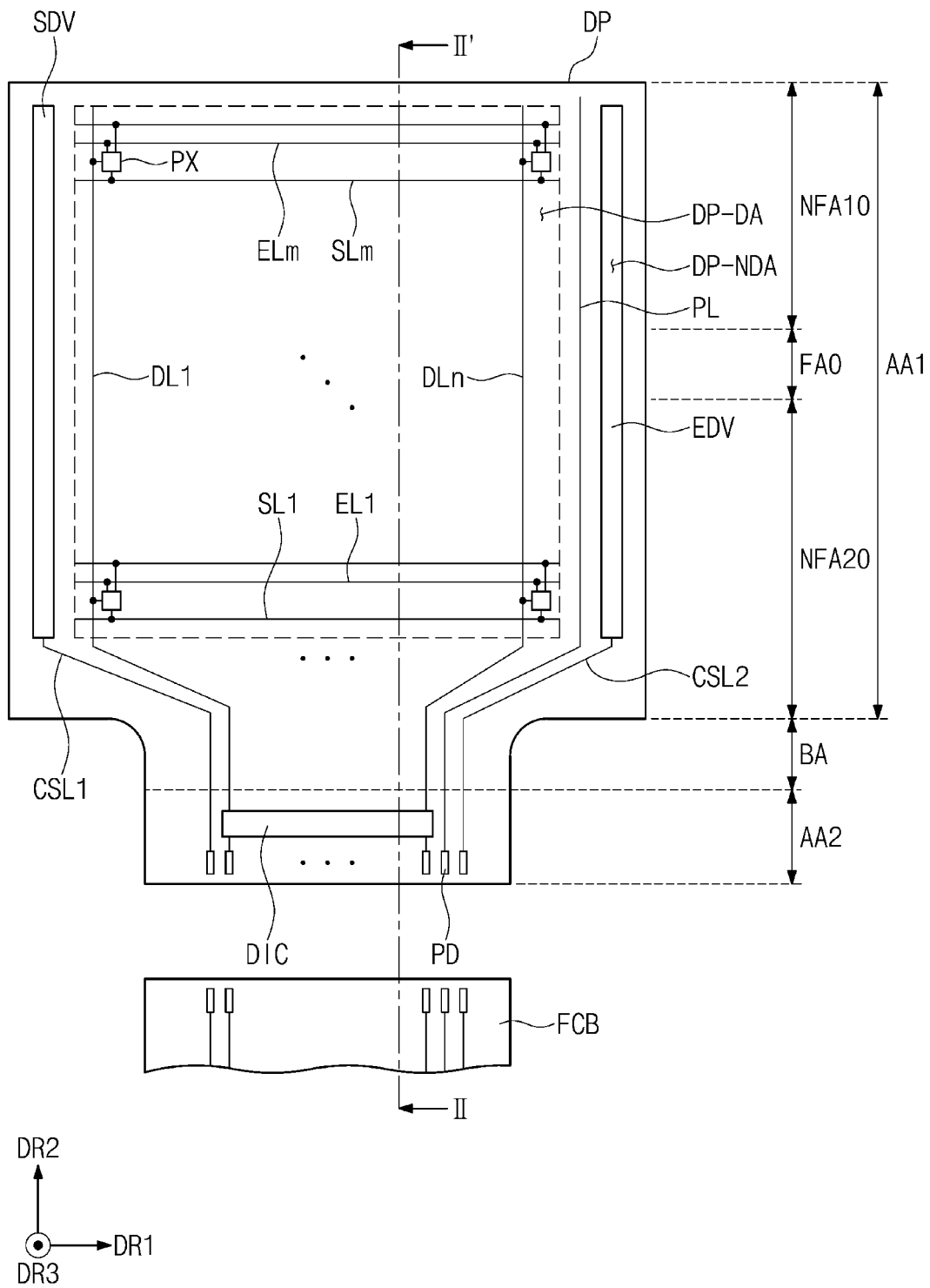
FIG. 4 is a schematic plan view of a display panel according to an embodiment.

The sensing electrodes may overlap the display area DP-DA (refer to FIG. 4). The trace lines may overlap the non-display area DP-NDA (refer to FIG. 4). The trace lines may extend toward a lower end of a second panel area AA2 via a bending area BA (refer to FIG. 4) to be adjacent to a pad PD shown in FIG. 4. The trace lines and the signal lines SL1-SLm, DL1-DLn, EL1-ELm, CSL1, CSL2, and PL (refer to FIG. 4) of the circuit element layer may be disposed on different layers.

The trace lines may be electrically connected to signal lines (input signal lines) provided for the input sensor IS of the display panel DP in a first panel area AA1 shown in FIG. 4. The input signal lines may be signal lines different from the signal lines SL1-SLm, DL1-DLn, EL1-ELm, CSL1, CSL2, and PL shown in FIG. 4, but the input signal lines and one of the signal lines SL1-SLm, DL1-DLn, EL1-ELm, CSL1, CSL2, and PL may be disposed on a same layer. Each of the input signal lines may be electrically connected to a corresponding pad PD (refer to FIG. 4). As a result, similar to the signal lines of the circuit element layer, the trace lines may be electrically connected to the circuit film FCB (refer to FIG. 4).

The optical film LF may reduce a reflectance of external light. The optical film LF may include a phase retarder and/or a polarizer. The optical film LF may include at least a polarizing film.

The optical film LF according to an embodiment may include color filters. The color filters may have an arrangement. The arrangement of color filters may be determined in consideration of emission colors of the pixels PX included in the display panel DP. The optical film LF may further include a black matrix adjacent to the color filters.

The optical film LF according to an embodiment may include a destructive interference structure. For example, the destructive interference structure may include a first reflective layer and a second reflective layer disposed in different layers. First reflected light and second reflected light respectively reflected from the first reflective layer and the second reflective layer may destructively interfere with each other, and thus the reflectance of external light may be decreased.

The lower member LM may include various functional members. The lower member LM may include a light blocking layer that blocks light incident on the display panel DP, an impact absorbing layer that absorbs external impact, a support layer that supports the display panel DP, and a heat dissipation layer that emits heat generated by the display panel DP. A detailed description of a stacked structure of the lower member LM will be described below.

FIG. 4 is a schematic plan view of a display panel according to an embodiment.

Referring to FIG. 4, the display panel DP may include the display area DP-DA and the non-display area DP-NDA around the display area DP-DA. The display area DP-DA and the non-display area DP-NDA may be determined depending on presence of pixels PX. The pixels PX may be disposed in the display area DP-DA. A scan driver SDV, a data driver, and a light emission driver EDV may be disposed in the non-display area DP-NDA. The data driver may be some circuits provided in the driving chip DIC.

The display panel DP may include the first panel area AA1, the second panel area AA2, and the bending area BA that may be defined in the second direction DR2. The second panel area AA2 and the bending area BA may be a region of the non-display area DP-NDA. The bending area BA may be disposed between the first panel area AA1 and the second panel area AA2.

The first panel area AA1 may be an area corresponding to the display surface DS of FIG. 1A. The first panel area AA1 may include a first unfolding area NFA10, a second unfolding area NFA20, and a folding area FA0. The first unfolding area NFA10, the second unfolding area NFA20, and the folding area FA0 may respectively correspond to the first unfolding area NFA1, the second unfolding area NFA2, the folding area FA of FIGS. 1A and 1B.

A length (or a width) of the bending area BA and the second panel area AA2 in the first direction DR1 may be smaller than a length (or a width) of the first panel area AA1 in the first direction DR1. The bending area BA may be bent around a bending axis extending in the first direction DR1, and a region of the bending area BA which has a small length in a direction parallel to the direction of extension of the bending axis may be more readily bent.

The display panel DP may include pixels PX, scan lines SL1 to SLm, data lines DL1 to DLn, emission lines EL1 to ELm, first and second control lines CSL1 and CSL2, a power line PL, and pads PD. Here, "m" and "n" may be integers. The pixels PX may be electrically connected to the scan lines SL1 to SLm, the data lines DL1 to DLn, and the emission lines EL1 to ELm.

The scan lines SL1 to SLm may extend in the first direction DR1 and may be electrically connected to the scan driver SDV. The data lines DL1 to DLn may extend in the second direction DR2 and may be electrically connected to the driving chip DIC via the bending area BA. The emission lines EL1 to ELm may extend in the first direction DR1 and may be electrically connected to the light emission driver EDV.

The power line PL may include a portion extending in the second direction DR2 and a portion extending in the first direction DR1. The portion extending in the first direction DR1 and the portion extending in the second direction DR2 may be disposed in different layers. The portion of the power line PL, extending in the second direction DR2 may extend to the second panel area AA2 via the bending area BA. The power line PL may provide a first voltage to the pixels PX.

The first control line CSL1 may be electrically connected to the scan driver SDV and may extend toward a lower end of the second panel area AA2 via the bending area BA. The second control line CSL2 may be electrically connected to the light emission driver EDV and may extend toward the lower end of the second panel area AA2 via the bending area BA.

In a plan view, the pads PD may be disposed adjacent to the lower end of the second panel area AA2. The driving chip DIC, the power line PL, the first control line CSL1, and the second control line CSL2 may be electrically connected to the pads PD, respectively. The circuit film FCB may be electrically connected to the pads PD through an anisotropic conductive adhesive layer. The circuit film FCB may be attached to the second panel area AA2.

Figure 5:
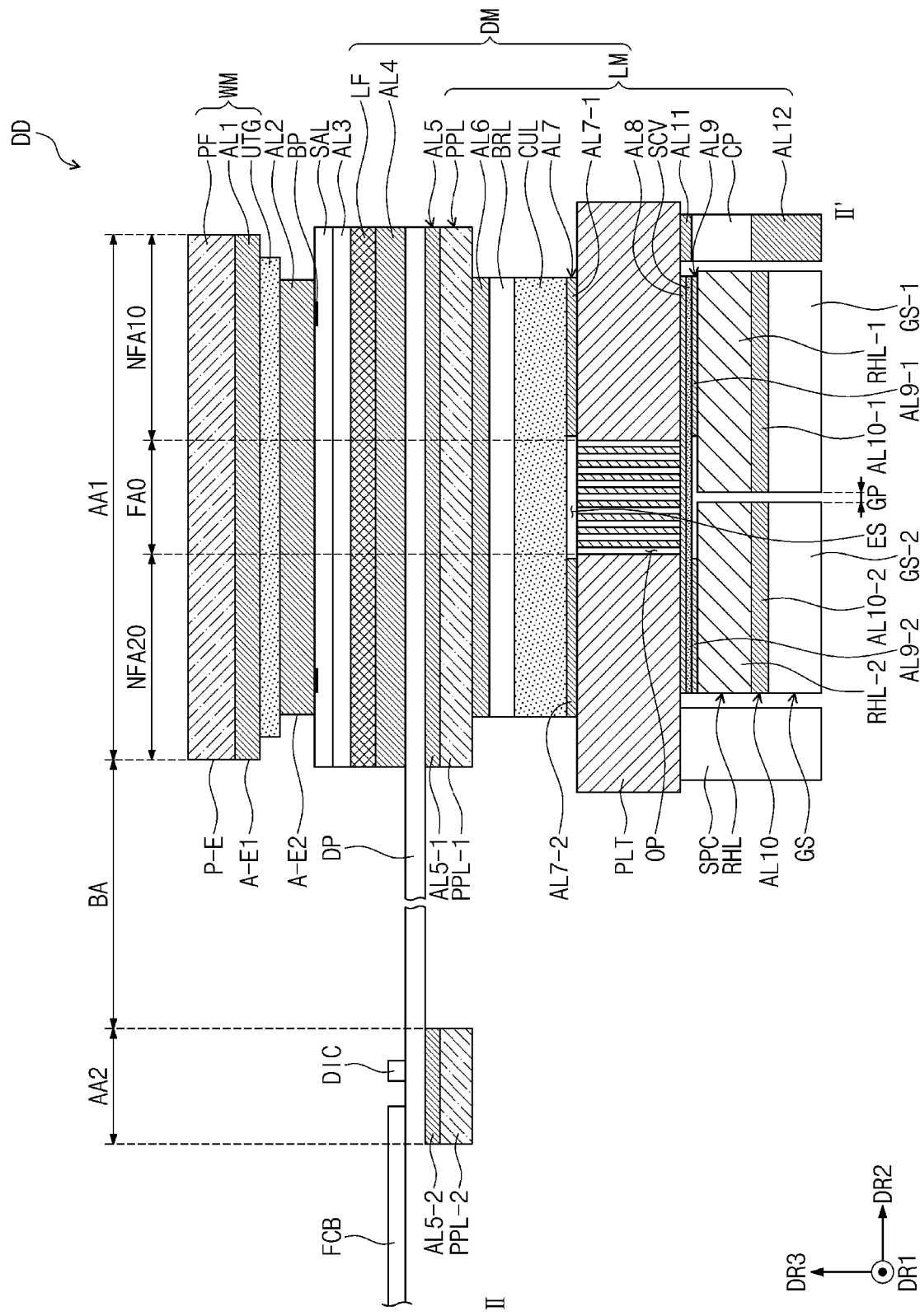
FIG. 5 is a schematic cross-sectional view of a display device according to an embodiment.
Figure 6:
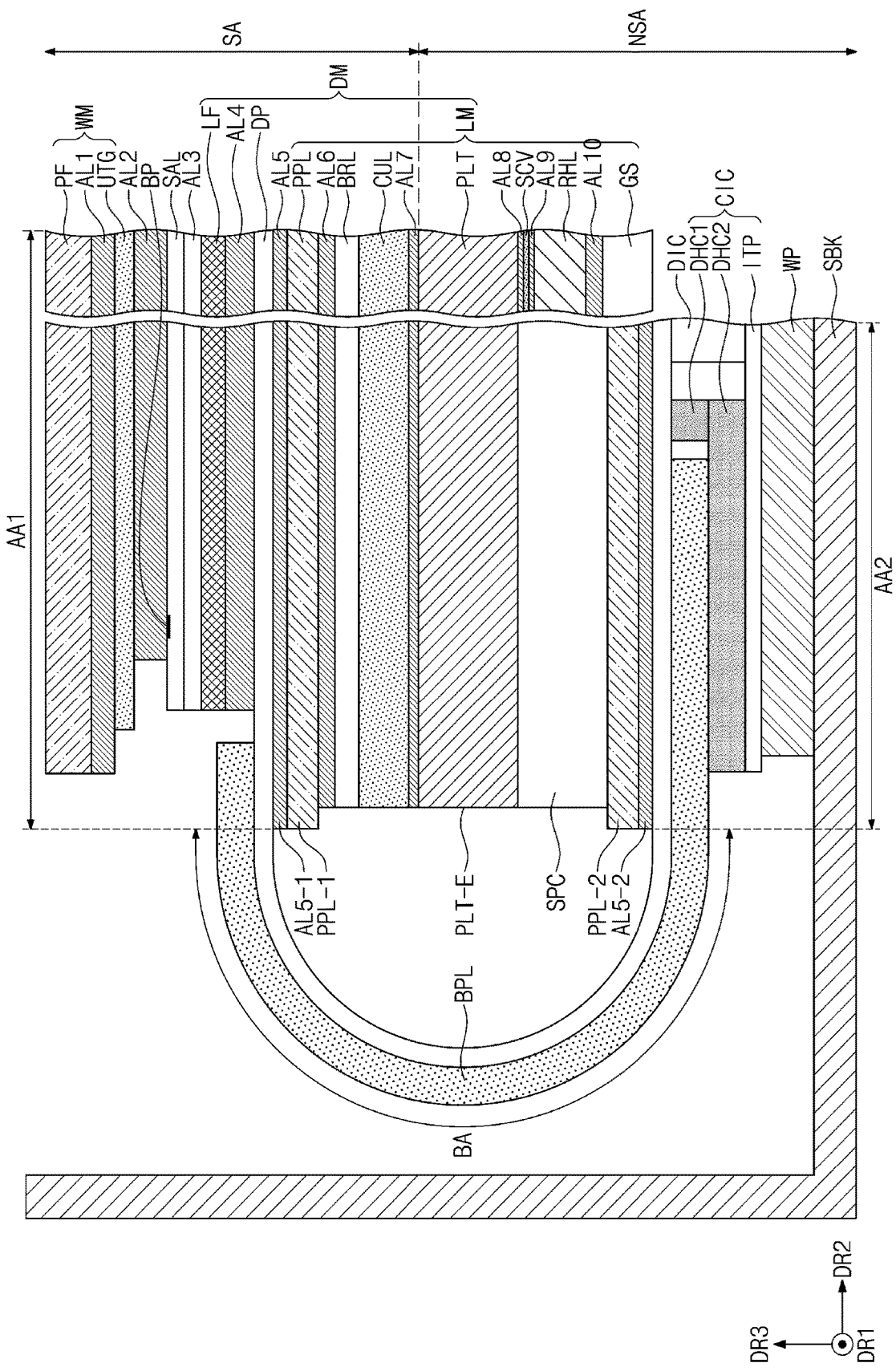
FIG. 6 is a schematic cross-sectional view of a display device according to an embodiment.

FIG. 5 is a schematic cross-sectional view of a display device according to an embodiment. FIG. 6 is a schematic cross-sectional view of a display device according to an embodiment.

FIG. 5 illustrates a state of the display device DD before the display device DD is provided in the electronic device ED (refer to FIG. 1A), and FIG. 6 illustrates a state of the display device DD provided in the electronic device ED (refer to FIG. 1A).

Referring to FIG. 6, in case that the display device DD is provided in the electronic device ED (refer to FIG. 1A), the first panel area AA1 and the second panel area AA2 of the display panel DP may be disposed on different planes. The second panel area AA2 may be disposed under the first panel area AA1.

Referring to FIGS. 5 and 6, the window module WM may include an ultra-thin glass substrate UTG, a plastic film PF disposed on the ultra-thin glass substrate UTG, and a first adhesive layer AL1 bonding the ultra-thin glass substrate UTG to the plastic film PF.

The ultra-thin glass substrate UTG may be a chemically strengthened glass. As the ultra-thin glass substrate UTG may be used, occurrence of wrinkles may be minimized even though folding and unfolding of the electronic device ED may be repeated. In an embodiment, a synthetic resin film may be used instead of the ultra-thin glass substrate UTG.

The plastic film PF may include polyimide, polycarbonate, polyamide, triacetylcellulose, polymethylmethacrylate, polyethylene terephthalate, or a combination thereof. Although not shown separately in the accompanying drawings, at least one of a hard coating layer, an anti-fingerprint layer, and an anti-reflection layer may be disposed on an upper surface of the plastic film PF.

The first adhesive layer AL1 may be a pressure sensitive adhesive (PSA) film or an optically clear adhesive (OCA) film. Adhesive layers to be described below may be also the same as the first adhesive layer AL1 and may include a general adhesive.

The first adhesive layer AL1 may be separated from the ultra-thin glass substrate UTG. Scratches may relatively readily occur on the plastic film PF because the strength of the plastic film PF is lower than that of the ultra-thin glass substrate UTG. After the first adhesive layer AL1 is separated from the ultra-thin glass substrate UTG, a new plastic film PF may be attached to the ultra-thin glass substrate UTG.

In a plan view, an edge P-E of the plastic film PF and an edge A-E1 of the first adhesive layer AL1 may be aligned with each other. The plastic film PF and the first adhesive layer AL1 may have a same size and a same shape.

The window module WM and the display module DM may be bonded by a second adhesive layer AL2. The second adhesive layer AL2 may include a transparent adhesive such as a pressure sensitive adhesive or an optically transparent adhesive.

In a plan view, an edge A-E2 of the second adhesive layer AL2 may overlap the window module WM. For example, the edge A-E2 of the second adhesive layer AL2 may overlap the ultra-thin glass substrate UTG. In a process of attaching the window module WM to the display module DM, pressure may be applied to the second adhesive layer AL2. The second adhesive layer AL2 may be pressured and may thus be stretched in directions parallel to the second direction DR2 and the first direction DR1. Here, the area of the second adhesive layer AL2 may be smaller than that of the ultra-thin glass substrate UTG so that the second adhesive layer AL2 does not protrude from the ultra-thin glass substrate UTG.

In case that the first adhesive layer AL1 and the second adhesive layer AL2 are attached to each other and the electronic device ED (refer to FIG. 1A) is folded, buckling or cracking may occur in the ultra-thin glass substrate UTG because the ultra-thin glass substrate UTG may not slip. However, according to an embodiment, because the area of the second adhesive layer AL2 may be smaller than that of the ultra-thin glass substrate UTG, the first adhesive layer AL1 and the second adhesive layer AL2 may not be attached to each other. Therefore, a probability that a foreign matter adheres to the second adhesive layer AL2 may be reduced.

An impact absorbing layer SAL may be attached to the second adhesive layer AL2. The impact absorbing layer SAL may be a functional layer for protecting the display panel DP from external impact. The impact absorbing layer SAL may be selected from films having an elastic modulus of 1 GPa or more at room temperature. The impact absorbing layer SAL may be a stretched film having an optical function. For example, the impact absorbing layer SAL may be an optical axis control film.

A bezel pattern BP may overlap the non-display area NDA illustrated in FIG. 1A. The bezel pattern BP may be provided by being printed on an upper surface of the impact absorbing layer SAL. The disclosure is not limited thereto, and a position of the bezel pattern BP may be variously modified. The bezel pattern BP may be a colored light blocking film and may be formed by, for example, a coating method. The bezel pattern BP may include a base material and a dye or pigment mixed with the base material. The bezel pattern BP may have a closed line shape in a plan view.

The display module DM may be bonded to the impact absorbing layer SAL by a third adhesive layer AL3. In an embodiment, the impact absorbing layer SAL and the third adhesive layer AL3 may be omitted.

The display module DM may include the optical film LF, the display panel DP, a panel protective layer PPL, a barrier layer BRL, a cushion layer CUL, a support layer PLT, a cover layer SCV, a heat dissipation layer RHL, a graphite layer GS, a spacer SPC, a step compensation pattern CP, and fourth, fifth, sixth, seventh, eighth, ninth, tenth, eleventh, and twelfth adhesive layers AL4, AL5, AL6, AL7, ALB, AL9, AL10, AL11, and AL12. The fourth to twelfth adhesive layers AL4 to AL12 may include a transparent adhesive such as a pressure sensitive adhesive or an optically transparent adhesive. Some of the above-described components in an embodiment may be omitted. For example, the step compensation pattern CP and the eleventh and twelfth adhesive layers AL11 and AL12 associated therewith may be omitted.

The optical film LF may be disposed in the first panel area AA1. The optical film LF may cover at least the display area DP-DA (refer to FIG. 2). The third adhesive layer AL3 may be bonded to the optical film LF and the impact absorbing layer SAL, and the fourth adhesive layer AL4 may be bonded to the optical film LF and the display panel DP. Although FIGS. 5 and 6 illustrate only the display panel DP, the input sensor IS may be further disposed between the display panel DP and the fourth adhesive layer Mil as illustrated in FIG. 3.

The panel protective layer PPL may be disposed under the display panel DP. The panel protective layer PPL may protect a lower part of the display panel DP. The panel protective layer PPL may include a flexible plastic material. The panel protective layer PPL may prevent scratches from occurring on a rear surface of the display panel DP during a process of manufacturing the display panel DP. The panel protective layer PPL may be a colored polyimide film. For example, the panel protective layer PPL may be an opaque yellow film, but the disclosure is not limited thereto.

In an embodiment, the panel protective layer PPL may not be disposed in the bending area BA. The panel protective layer PPL may include a first panel protective layer PPL-1 protecting the first panel area AA1 and a second panel protective layer PPL-2 protecting the second panel area AA2 in the display panel DP. In case that the bending area BA is bent, the second panel protective layer PPL-2 together with the second panel area AA2 of the display panel DP may be disposed under the first panel area AA1 and the first panel protective layer PPL-1. The panel protective layer PPL may not be disposed in the bending area BA, and thus the bending area BA may be more readily bent.

The fifth adhesive layer AL5 may bond the panel protective layer PPL to the display panel DP. The fifth adhesive layer AL5 may include a first portion AL5-1 corresponding to the first panel protective layer PPL-1 and a second portion AL5-2 corresponding to the second panel protective layer PPL-2. The first portion AL5-1 may bond the first panel protective layer PPL-1 to the first panel area AA1 of the display panel DP, and the second portion AL5-2 may bond the second panel protective layer PPL-2 to the second panel area AA2 of the display panel DP.

The barrier layer BRL may be disposed under the panel protective layer PPL. The sixth adhesive layer AL6 may be disposed between the panel protective layer PPL and the barrier layer BRL and may bond the barrier layer BRL to the panel protective layer PPL. The sixth adhesive layer AL6 may be attached to an upper surface of the barrier layer BRL, and the sixth adhesive layer AL6 may also be referred to as an upper adhesive layer.

The barrier layer BRL may increase resistance against a compressive force due to external pressing. Therefore, the barrier layer BRL may prevent deformation of the display panel DP. The barrier layer BRL may include a flexible plastic material such as polyimide or polyethylene terephthalate.

The barrier layer BRL may absorb light incident from the outside. The barrier layer BRL may include a light blocking material or may be a colored film having a low light transmittance. For example, the barrier layer BRL may be a black plastic film, for example, a black polyimide film. In case that the display module DM is viewed from above the window module WM, components disposed under the barrier layer BRL may not be visually recognized by a user.

The cushion layer CUL may be attached to the bottom of the barrier layer BRL. The cushion layer CUL may absorb an external impact and may protect the display panel DP. An elastic modulus of the cushion layer CUL may be lower than that of the support layer PLT. The cushion layer CUL may include a foam sheet having elasticity. The cushion layer CUL may include sponge or polyurethane.

The support layer PLT may be disposed under the cushion layer CUL. The support layer PLT may be disposed under the first panel area AA1. The support layer PLT may overlap the first panel area AA1.

The support layer PLT may include a metallic material or a non-metallic material. For example, the support layer PLT may include a metallic material such as stainless steel. For example, the support layer PLT may include SUS 304, but the disclosure is not limited thereto, and the support layer PLT may include various metallic materials. The support layer PLT may improve heat dissipation performance of the display device DD. The support layer PLT may include a non-metallic material such as glass or plastic. For example, the support layer PLT may include polyethylene or polyimide, but the disclosure is not limited thereto, and the support layer PLT may include various non-metallic materials. The support layer PLT may include a material having an elastic modulus of about 60 GPa or more. The support layer PLT may support the display panel DP.

Openings OP may be defined in a portion, of the support layer PLT, corresponding to the folding area FA0. The openings OP may improve flexibility of the support layer PLT.

Each of the areas of the barrier layer BRL and the cushion layer CUL may be smaller than that of the support layer PLT, in a plan view. In a plan view, the barrier layer BRL may overlap a portion of the support layer PLT. Another portion of the support layer PLT may not overlap the barrier layer BRL.

The seventh adhesive layer AL7 may be disposed between the cushion layer CUL and the support layer PLT. The seventh adhesive layer AL7 may bond the cushion layer CUL and the support layer PLT to each other. The seventh adhesive layer AL7 may include a first portion AL7-1 and a second portion AL7-2 spaced from each other.

The first portion AL7-1 and the second portion AL7-2 may be spaced from each other with the openings OP interposed therebetween. In a plan view, the seventh adhesive layer AL7 may not overlap the openings OP. Further, in a plan view, the seventh adhesive layer AL7 may be spaced from the openings OP.

The first portion AL7-1 may overlap the first unfolding area NFA10, the second portion AL7-2 may overlap the second unfolding area NFA20, and each of the first portion AL7-1 and the second portion AL7-2 may not overlap the folding area FA0. The seventh adhesive layer AL7 may not be disposed in a region corresponding to the folding area FA0, and thus flexibility of the support layer PLT may be improved.

The cushion layer CUL may be spaced from the support layer PLT in a region thereof overlapping the folding area FA0. For example, an empty space ES may be defined between the support layer PLT and the cushion layer CUL on the region of the cushion layer CUL overlapping the folding area FA0. Air may be provided in the empty space ES.

In case that the electronic device ED (refer to FIG. 1A) is folded, shapes of the openings OP defined in the support layer PLT may not be visually recognized from outside of the electronic device ED (refer to FIG. 1A) because the empty space ES is defined between the cushion layer CUL and the support layer PLT.

As the barrier layer BRL includes the light blocking material or the colored film having the low light transmittance is used as the barrier layer BRL, a color difference of the support layer PLT may not be visually recognized from the outside. For example, in the support layer PLT, the color difference between a first support area in which the openings OP are defined and a second support area in which the openings OP are not defined may not be visually recognized from the outside. The first support area may be an area overlapping the folding area FA0, and the second support area may be an area overlapping the first unfolding area NFA10 and the second unfolding area NFA20.

A thickness of the seventh adhesive layer AL7 may be smaller than that of the sixth adhesive layer AL6. For example, the thickness of the sixth adhesive layer AL6 may be about 25 µm, and the thickness of the seventh adhesive layer AL7 may be about 16 µm.

As the thickness of the seventh adhesive layer AL7 decreases, a step due to the seventh adhesive layer AL7 may be reduced. As the step becomes smaller, deformation of the shape of the stacked structure due to folding and unfolding of the electronic device ED (refer to FIG. 1A) may decrease, but the openings OP may be visually recognized, or the seventh adhesive layer AL7 may be debonded by a repeated folding operation. As the thickness of the seventh adhesive layer AL7 increases, the openings OP may not be visually recognized, and the reliability of the adhesion of the seventh adhesive layer AL7, which may be associated with a repeated folding operation of the electronic device ED, may increase. However, as the thickness of the seventh adhesive layer AL7 increases, the step may increase. Therefore, the thickness of the seventh adhesive layer AL7 may be selected within an appropriate range in consideration of folding reliability, adhesion reliability, and visibility of the openings OP.

The eighth adhesive layer AL8 may be disposed under the support layer PLT, and the cover layer SCV may be disposed under the eighth adhesive layer AL8. The support layer PLT and the cover layer SCV may be bonded to each other by the eighth adhesive layer AL8. The cover layer SCV may be manufactured in sheet form and may be attached to the support layer PLT.

The eighth adhesive layer AL8 and the cover layer SCV may cover the openings OP defined in the support layer PLT. Therefore, the cover layer SCV may prevent foreign substances from entering the openings OP. The cover layer SCV may have a lower modulus of elasticity than that of the support layer PLT. For example, the cover layer SCV may include thermoplastic polyurethane, rubber, silicone, or a combination thereof, but the disclosure is not limited thereto.

The ninth adhesive layer AL9 may be disposed under the cover layer SCV. The ninth adhesive layer AL9 may include a first cover portion AL9-1 and a second cover portion AL9-2. The first cover portion AL9-1 and the second cover portion AL9-2 may be spaced from each other. In a plan view, the first cover portion AL9-1 and the second cover portion AL9-2 may be spaced from each other with the openings OP interposed therebetween. Each of the first cover portion AL9-1 and the second cover portion AL9-2 may not overlap with the folding area FA0.

The heat dissipation layer RHL may be disposed under the ninth adhesive layer AL9. The heat dissipation layer RHL may be a sheet having high thermal conductivity. The heat dissipation layer RHL may include a metal or a metal alloy, and for example, the heat dissipation layer RHL may include copper, a copper alloy, graphite, or a combination thereof.

The heat dissipation layer RHL may include a first heat dissipation layer RHL-1 and a second heat dissipation layer RHL-2. The first heat dissipation layer RHL-1 and the second heat dissipation layer RHL-2 may be spaced apart from each other by a gap GP. The gap GP may be about 0.4 mm to about 2.4 mm, but the disclosure is not limited thereto. The gap GP may correspond to the folding area FA0.

The first heat dissipation layer RHL-1 may be bonded to the cover layer SCV by the first cover portion AL9-1, and the second heat dissipation layer RHL-2 may be bonded to the cover layer SCV by the second cover portion AL9-2. In a plan view, the first heat dissipation layer RHL-1 may overlap a portion of the folding area FA0 and the first unfolding area NFA10, and the second heat dissipation layer RHL-2 may overlap another portion of the folding area FA0 and the second unfolding area NFA20.

In a plan view, a portion of the first heat dissipation layer RHL-1 may overlap a portion of the openings OP, and a portion of the second heat dissipation layer RHL-2 may overlap another portion of the openings OP. The first heat dissipation layer RHL-1 and the second heat dissipation layer RHL-2 may serve to support the support layer PLT. For example, a region of the support layer PLT in which the openings OP are defined may be supported by the first heat dissipation layer RHL-1 and the second heat dissipation layer RHL-2. Therefore, the first heat dissipation layer RHL-1 and the second heat dissipation layer RHL-2 may also be referred to as a first lower support layer and a second lower support layer, respectively.

The tenth adhesive layer AL10 may be disposed under the heat dissipation layer RHL. The tenth adhesive layer AL10 may include a first portion AL10-1 corresponding to the first heat dissipation layer RHL-1 and a second portion AL10-2 corresponding to the second heat dissipation layer RHL-2. The first portion AL10-1 and the second portion AL10-2 may be spaced apart from each other by the gap GP.

The graphite layer GS may be disposed under the tenth adhesive layer AL10. The graphite layer GS may be a heat conducting sheet having high thermal conductivity. The graphite layer GS may be a graphitized polymer film. The polymer film may be, for example, a polyimide film.

The graphite layer GS may include a first graphite layer GS-1 corresponding to the first portion AL10-1 and a second graphite layer GS2 corresponding to the second portion AL10-2. The first graphite layer GS-1 and the second graphite layer GS-2 may be spaced from each other by the gap GP. In a plan view, the gap GP between the first graphite layer GS-1 and the second graphite layer GS-2 may overlap the folding area FA0. In a plan view, the first graphite layer GS-1 may overlap a portion of the folding area FA0 and the first unfolding area NFA10, and the second graphite layer GS-2 may overlap another portion of the folding area FA0 and the second unfolding area NFA20.

Some of the stacked structures illustrated in FIG. 5 may be omitted, or other stacked structures may be added. A position of the stacked structure may be changed. For example, in an embodiment, the graphite layer GS may be omitted. In an embodiment, the cushion layer CUL may be spaced from the display panel DP with the support layer PLT interposed therebetween. Here, as the cushion layer CUL is disposed under the heat dissipation layer RHL firmly supported by the support layer PLT, impact absorbing performance of the cushion layer CUL may be improved. Further, to prevent the inflow of static electricity, an insulating layer may be further disposed under the graphite layer GS. The insulating layer may prevent electrical interference between the circuit film FCB and components disposed on the insulating layer.

A surface of the step compensation pattern CP may be bonded to the support layer PLT by the eleventh adhesive layer AL11. The twelfth adhesive layer AL12 may be disposed on another surface of the step compensation pattern CP. The twelfth adhesive layer AL12 may be used in case that the display device DD (refer to FIG. 2) is combined to another element of the electronic device ED (refer to FIG. 2), for example, the set bracket SBK.

Referring to FIG. 6, the bending area BA may be bent so that the second panel area AA2 is disposed under the first panel area AA1. Therefore, the driving chip DIC may be disposed under the first panel area AA1. For example, the first panel area AA1 and the second panel area AA2 may be disposed on different planes (or reference planes). The bending area BA may be bent to be convex in a horizontal direction in a cross-sectional view. The bending area BA has a curvature and a radius of curvature. The radius of curvature may be about 0.1 mm to about 0.5 mm.

The bending area BA may be bent to surround an edge PLT-E of the support layer PLT. A portion of the support layer PLT may be disposed between the first panel area AA1 and the second panel area AA2.

A bending protective layer BPL may be disposed at least in the bending area BA. The bending protective layer BPL may overlap the bending area BA, the first panel area AA1, and the second panel area AA2. The bending protective layer BPL may be disposed on a portion of the first panel area AA1 and a portion of the second panel area AA2 as well as the bending area BA.

The bending protective layer BPL may be bent together with the bending area BA. The bending protective layer BPL may protect the bending area BA from external impact and control a neutral surface of the bending area BA. The bending protective layer BPL may control a stress of the bending area BA to allow the neutral surface to become close to the signal lines arranged in the bending area BA.

A surface of the second panel protective layer PPL-2 to which the second portion AL5-2 of the fifth adhesive layer AL5 is not attached may be attached to the spacer SPC. Although FIGS. 5 and 6 illustrate the spacer SPC as a single layer, the spacer SPC may have a multilayer structure. The spacer SPC may include a layer having improved waterproofing properties.

A chip cover layer CIC may be attached to the second panel area AA2. The chip cover layer CIC may include a first step compensation layer DHC1, a second step compensation layer DHC2, and an insulating tape ITP.

Each of the first step compensation layer DHC1 and the second step compensation layer DHC2 may be defined as double-sided tape. For example, each of the first step compensation layer DHC1 and the second step compensation layer DHC2 may include a base layer such as polyethylene terephthalate having flexibility and adhesives disposed on upper and lower surfaces of the base layer. The adhesive may include an acrylic adhesive. However, materials of the base layer and the adhesive are not limited thereto.

The insulating tape ITP may cover the driving chip DIC. FIG. 6 illustrates the insulating tape ITP as a single layer, but the disclosure is not limited thereto. For example, the insulating tape ITP may have a multilayer structure. The insulating tape ITP may include two insulating layers and conductive tape disposed between the two insulating layers.

At least some of the components used in the foldable electronic device ED (refer to FIG. 1A) may slip. Accordingly, buckling in a specific layer may be prevented. For example, the components disposed on the support layer PLT may slip, and the components, disposed under the support layer PLT, including the support layer PLT may not slip.

The electronic device ED (refer to FIG. 1A) may be divided into a slip area SA and a non-slip area NSA with respect to the support layer PLT. The components arranged in the slip area SA or the components arranged on the support layer PLT may slip as the electronic device ED (refer to FIG. 1A) may be folded and unfolded. Therefore, sizes of the components disposed in the slip area SA may be determined in consideration of an area in which each component moves. For example, the area of the ultra-thin glass substrate UTG used in the foldable electronic device ED (refer to FIG. 1A) may be smaller than the area of the display panel DP in an assembled state. In case that the electronic device ED (refer to FIG. 1A) is flooded, water may flow into the driving chip DIC and the circuit film FCB through a region not covered by the ultra-thin glass substrate UTG.

According to an embodiment, to protect the driving chip DIC and the circuit film FCB from water, a waterproofing tape WP may be used in the non-slip area NSA. For example, the waterproofing tape WP may be attached around a region where the driving chip DIC and the circuit film FCB may be disposed. The waterproofing tape WP may be attached to the set bracket SBK. Even in case that the electronic device ED (refer to FIG. 1A) is flooded, a risk of flooding the driving chip DIC may be minimized.

Figure 7:
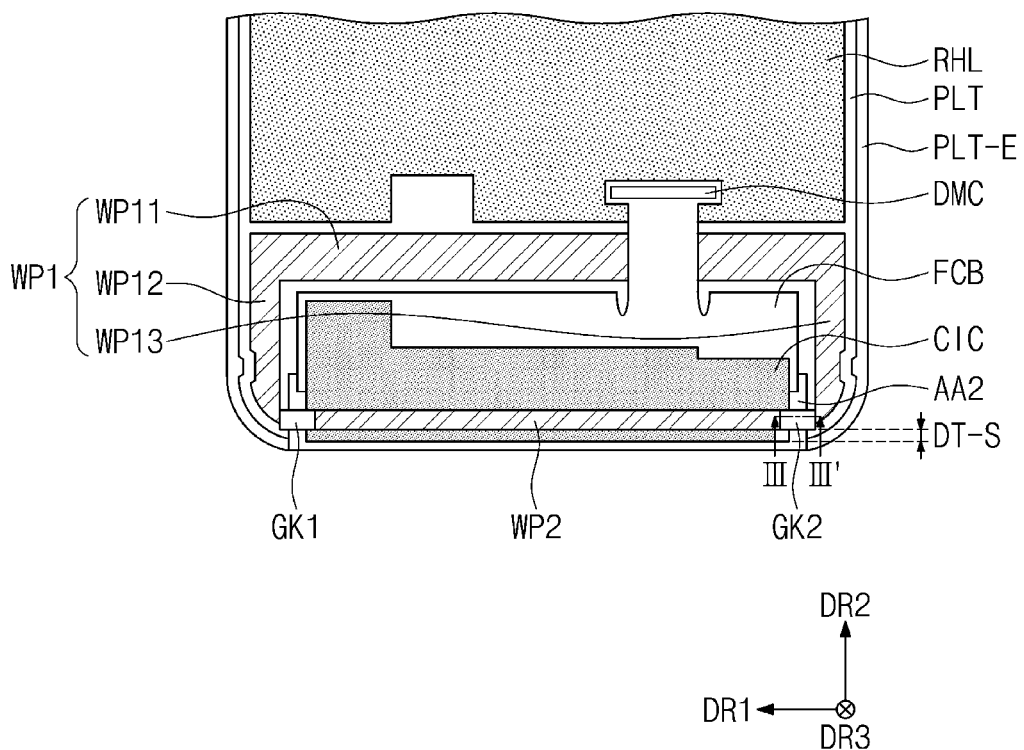
FIG. 7 is a schematic rear view of a display device according to an embodiment.
Figure 8:
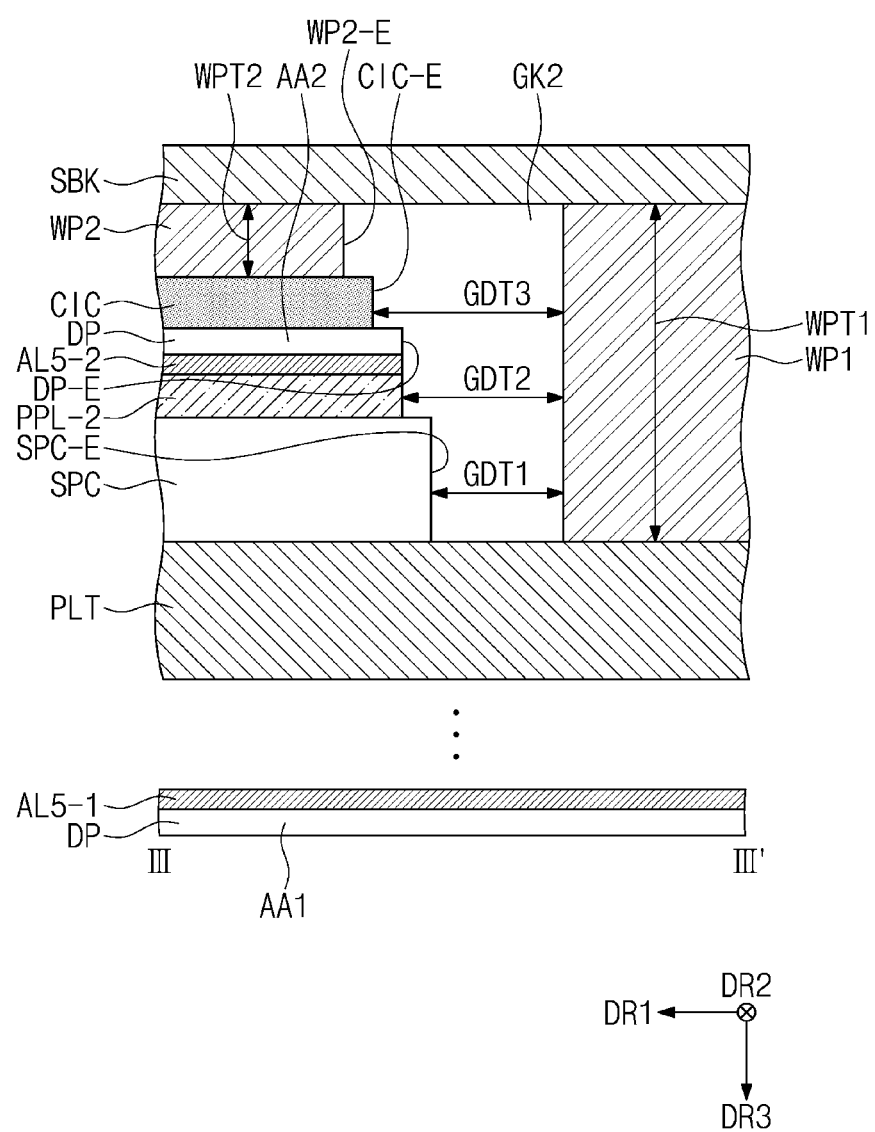
FIG. 8 is a schematic cross-sectional view of a display device according to an embodiment.

FIG. 7 is a schematic rear view of a display device according to an embodiment. FIG. 8 is a schematic cross-sectional view of a display device according to an embodiment.

Referring to FIGS. 7 and 8, a first waterproofing tape WP1 and a second waterproofing tape WP2 may be disposed under the support layer PLT. The first waterproofing tape WP1 may be disposed between the support layer PLT and the set bracket SBK and may be attached to the set bracket SBK. The second waterproofing tape WP2 may be disposed between the chip cover layer CIC and the set bracket SBK and may be attached to the set bracket SBK. A thickness WPT1 of the first waterproofing tape WP1 may be greater than a thickness WPT2 of the second waterproofing tape WP2.

When viewed in a thickness direction of the display panel DP, for example, in the third direction DR3, the first waterproofing tape WP1 may be spaced from the second panel area AA2. When viewed in the third direction DR3, the second waterproofing tape WP2 may overlap the second panel area AA2. The first waterproofing tape WP1 and the second waterproofing tape WP2 may also overlap the second unfolding area NFA20 (refer to FIG. 4).

The first waterproofing tape WP1 may include a first portion WP11 extending in the first direction DR1, a second portion WP12 extending from an end of the first portion WP11 in the second direction DR2, and a third portion WP13 extending from another end of the first portion WP11 in the second direction DR2. A portion of the second panel area AA2 may be disposed in a region surrounded by the first, second, and third portions WP11, WP12, and WP13.

The second waterproofing tape WP2 may extend in the first direction DR1. A first gasket GK1 may be disposed between the second portion WP12 of the first waterproofing tape WP1 and the second waterproofing tape WP2, and a second gasket GK2 may be disposed between the third portion WP13 of the first waterproofing tape WP1 and the second waterproofing tapes WP2. A portion of the driving chip DIC (refer to FIG. 2) and a portion of the circuit film FCB may be surrounded by the first waterproofing tape WP1, the second waterproofing tape WP2, the first gasket GK1, and the second gasket GK2.

The first gasket GK1 and the second gasket GK2 may fill a gap between the first waterproofing tape WP1 and the second waterproofing tape WP2. The first gasket GK1 and the second gasket GK2 may be curable resins. Waterproofing reliability may be further improved by the first and second gaskets GK1 and GK2 in a region surrounded by the first waterproofing tape WP1 and the second waterproofing tape WP2.

According to an embodiment, sidewalls defining areas in which the first gasket GK1 and the second gasket GK2 are to be formed may have positive step structures, respectively. The first gasket GK1 and the second gasket GK2 may be inserted in a direction from the second waterproofing tape WP2 to the support layer PLT. In the above direction, a width of a region where each of the first gasket GK1 and the second gasket GK2 is to be formed may be gradually reduced, and thus the regions where the first gasket GK1 and the second gasket GK2 are to be formed may be defined as the positive step structure.

An edge CIC-E of the chip cover layer CIC may protrude more than an edge WP2-E of the second waterproofing tape WP2, and an edge DP-E of the second panel area AA2 of the display panel DP may protrude more than the edge CIC-E of the chip cover layer CIC. The edge CIC-E of the chip cover layer CIC may protrude less than the edge DP-E of the second panel area AA2 and may protrude more than the edge WP2-E of the second waterproofing tape WP2. An edge SPC-E of the spacer SPC may protrude more than the edge DP-E of the second panel area AA2.

A first distance GDT1 between the edge SPC-E, of the spacer SPC, contacting the gasket GK2 and the first waterproofing tape WP1, a second distance GDT2 between an edge, of the second panel protective layer PPL-2, contacting the gasket GK2 and the first waterproofing tape WP1, and a third distance GDT3 between the edge CIC-E of the chip cover layer CIC and the first waterproofing tape WP1, may be defined. The first distance GDT1 may be smaller than the second distance GDT2 and the third distance GDT3, and the second distance GDT2 may be smaller than the third distance GDT3.

As the sidewalls (or the edges) defining regions in which the first gasket GK1 and the second gasket GK2 are to be formed have the positive step structures, a probability that the regions are not filled with the first gasket GK1 and the second gasket GK2 may be reduced. Therefore, a risk of flooding the driving chip DIC (refer to FIG. 2) may be minimized.

The first gasket GK1 and the second gasket GK2 may be spaced from an edge PLT-E of the support layer PLT by a distance DT-S. The edge PLT-E of the support layer PLT may be a side surface of the support layer PLT extending in the first direction DR1 and may be surrounded by the bending area BA (refer to FIG. 6) of the display panel DP.

The second panel area AA2 adjacent to the bending area BA (refer to FIG. 6) may be lifted by repulsive force of the bending area BA (refer to FIG. 6). In case that the first gasket GK1 and the second gasket GK2 are inserted into a portion where the lifting occurs, the lifting may be exacerbated. Therefore, the first gasket GK1 and the second gasket GK2 may be spaced from the edge PLT-E of the support layer PLT by the distance DT-S, and the lifting and the risk of flooding may be minimized.

Figure 9:
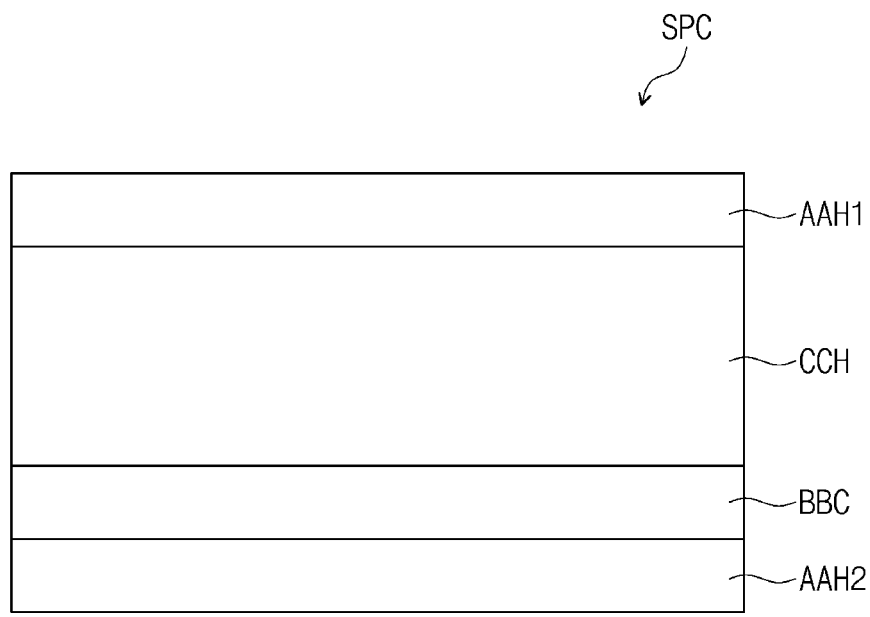
FIG. 9 is a schematic cross-sectional view of a spacer according to an embodiment.

FIG. 9 is a schematic cross-sectional view of a spacer according to an embodiment.

Referring to FIG. 9, the spacer SPC may have waterproofing properties. For example, the spacer SPC may include a first adhesive layer AAH1 and a second adhesive layer AAH2, a base layer BBC, and a closed cell foam CCH. The base layer BBC and the closed cell foam CCH may be disposed between the first adhesive layer AAH1 and the second adhesive layer AAH2.

According to the disclosure, the risk of flooding may be minimized because the spacer SPC has a waterproofing structure. At least one of the first waterproofing tape WP1 (refer to FIG. 8) and the second waterproofing tape WP2 (refer to FIG. 8) described above may also have a stacked structure substantially the same as that illustrated in FIG. 9.

Figure 10:
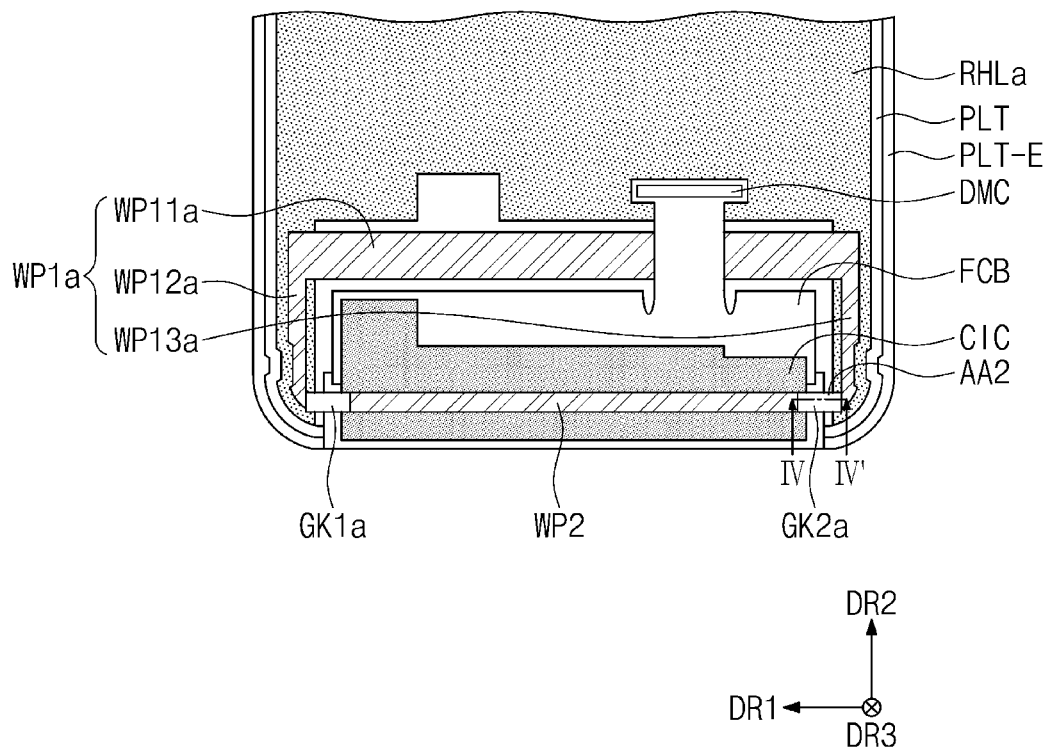
FIG. 10 is a schematic rear view of a display device according to an embodiment.
Figure 11:
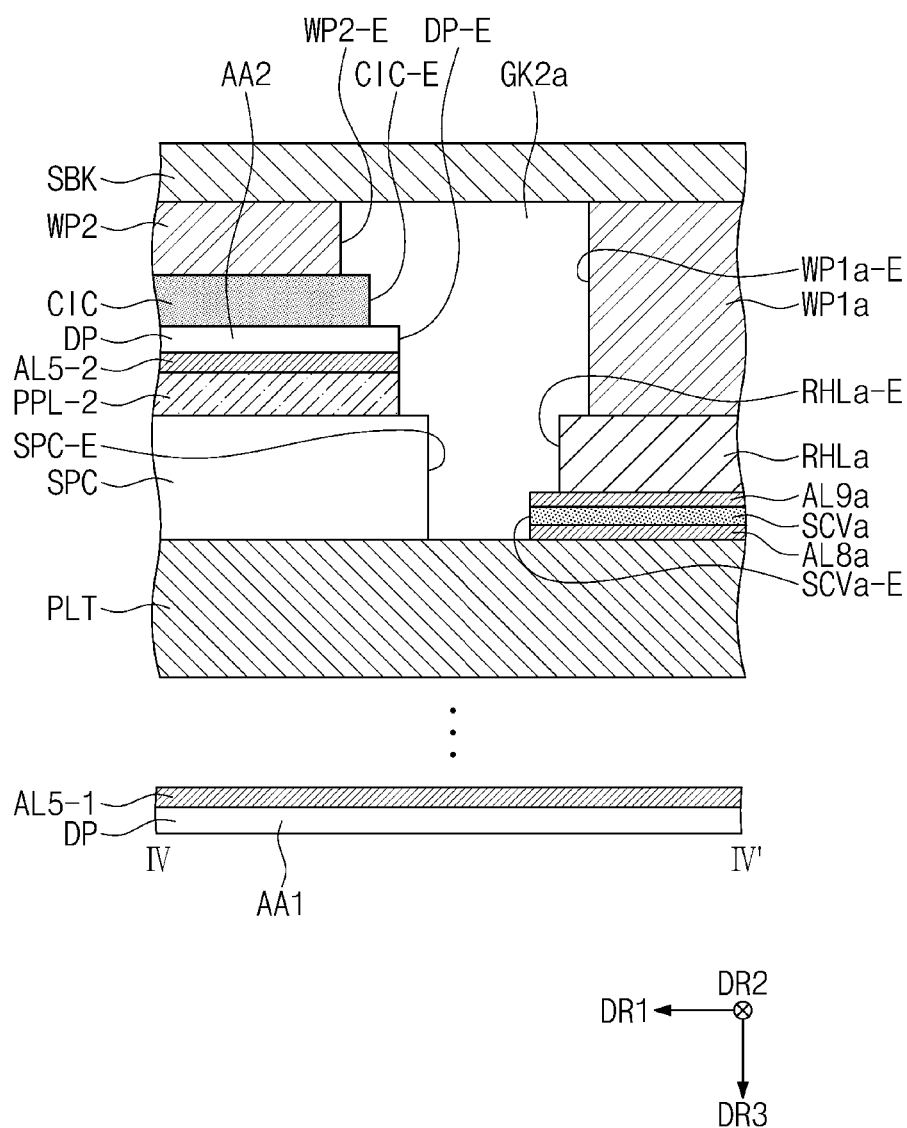
FIG. 11 is a schematic cross-sectional view of a display device according to an embodiment.

FIG. 10 is a schematic rear view of a display device according to an embodiment. FIG. 11 is a schematic cross-sectional view of a display device according to an embodiment.

In descriptions of FIGS. 10 and 11, the same reference numerals are used for components that are substantially the same as those described with reference to FIGS. 7 and 8, and descriptions thereof will be omitted.

Referring to FIGS. 10 and 11, a first waterproofing tape WP1a may include a first portion WP11a extending in the first direction DR1, a second portion WP12a extending from an end of the first portion WP11a in the second direction DR2, and a third portion WP13a extending from another end of the first portion WP11a in the second direction DR2. A portion of the second panel area AA2 may be disposed in a region surrounded by the first, second, and third portions WP11a, WP12a, and WP13a.

An eighth adhesive layer AL8a, a cover layer SCVa, a ninth adhesive layer AL9a, and a heat dissipation layer RHLa may be extended (or expanded) to overlap the second portion WP12a and the third portion WP13a of a first waterproofing tape WP1a.

The eighth adhesive layer AL8a, the cover layer SCVa, the ninth adhesive layer AL9a, and the heat dissipation layer RHLa may be sequentially disposed between the support layer PLT and the first waterproofing tape WP1a. The cover layer SCVa may be disposed under the support layer PLT, the heat dissipation layer RHLa may be disposed under the cover layer SCVa, and the first waterproofing tape WP1a may be attached to the heat dissipation layer RHLa.

According to an embodiment, sidewalls defining regions in which a first gasket GK1a and a second gasket GK2a are to be formed may have positive step structures. An edge RHLa-E of the heat dissipation layer RHLa may protrude more than an edge WP1a-E of the first waterproofing tape WP1, and an edge SCVa-E of the cover layer SCVa may protrude more than the edge RHLa-E of the heat dissipation layer RHLa.

As the sidewalls (or edges) defining regions where the first gasket GK1a and the second gasket GK2a are to be formed have the positive step structures, a probability that the regions are not filled with the first gasket GK1a and the second gasket GK2a may be reduced. Therefore, the risk of flooding the driving chip DIC (refer to FIG. 2) may be minimized.

According to the above, the waterproofing tape may be attached to the periphery of the region where the driving chip and the circuit film are disposed and to the set bracket. In case that the electronic device is flooded, the probability that the driving chip is flooded may be reduced because the region where the driving chip may be disposed may be surrounded by the waterproofing tape.

The waterproofing tape may be provided as pieces of waterproofing tape, and the gasket may be provided in the gap between the pieces of waterproofing tape, thereby filling the gap. The sidewalls (or the edges) defined in the region where the gasket is to be formed may have the positive step structure. Therefore, the probability that the gasket is not filled in the gap may be reduced. The waterproofing reliability for the region enclosed by the gasket and the pieces of waterproofing tape may be further improved.

While the disclosure has been described with reference to embodiments thereof, it will be apparent to those of ordinary skill in the art that various changes and modifications may be made thereto without departing from the spirit and scope of the disclosure. Therefore, the disclosed subject matter should not be limited to any single embodiment described herein, and the scope of the disclosure shall be determined according to the attached claims including equivalents thereof.

What is claimed is:

1. An electronic device comprising:
  a display panel including a first panel area, a bending area, and a second panel area;
  a support layer disposed under the first panel area of the display panel;
  a set bracket disposed under the support layer;
  a first waterproofing tape disposed between the support layer and the set bracket, the first waterproofing tape being attached to the set bracket; and
  a second waterproofing tape attached to the set bracket, wherein
  the bending area is bent,
  the second panel area is disposed under the first panel area,
  the first waterproofing tape is spaced from the second panel area in a thickness direction of the display panel, and
  the second waterproofing tape overlaps the second panel area.

2. The electronic device of claim 1, wherein the first waterproofing tape has a thickness greater than a thickness of the second waterproofing tape.

3. The electronic device of claim 1, wherein
  the bending area is bent with respect to a bending axis extending in a first direction, and
  the second waterproofing tape is extended in the first direction.

4. The electronic device of claim 1, wherein
  the first waterproofing tape includes:
    a first portion extending in a first direction,
    a second portion extending from an end of the first portion in a second direction intersecting the first direction; and
    a third portion extending from another end of the first portion in the second direction, and
  the second panel area is disposed in a region surrounded by the first portion, the second portion, and the third portion.

5. The electronic device of claim 4, further comprising:
  a first gasket disposed between the second portion of the first waterproofing tape and the second waterproofing tape; and
  a second gasket disposed between the third portion of the first waterproofing tape and the second waterproofing tape.

6. The electronic device of claim 5, wherein
  the second panel area includes an edge adjacent to the first gasket and the second gasket, and
  the edge of the second panel area protrudes more than an edge of the second waterproofing tape.

7. The electronic device of claim 6, wherein
  a chip cover layer has an edge between the second panel area and the second waterproofing tape, and
  the edge of the chip cover layer protrudes more than the edge of the second waterproofing tape and protrudes less than the edge of the second panel area.

8. The electronic device of claim 6, further comprising:
  a spacer disposed between the support layer and the second panel area, wherein
  the spacer has an edge adjacent to the first gasket and the second gasket, and
  the edge of the spacer protrudes more than the edge of the second panel area and the edge of the second waterproofing tape.

9. The electronic device of claim 8, wherein the spacer has waterproofing properties.

10. The electronic device of claim 8, wherein the spacer includes a closed-cell foam.

11. The electronic device of claim 5, further comprising:
  a cover layer disposed under the support layer; and
  a heat dissipation layer disposed under the cover layer, wherein the first waterproofing tape is attached to the heat dissipation layer.

12. The electronic device of claim 11, wherein
  the cover layer has an edge adjacent to the first gasket and the second gasket,
  the edge of the cover layer protrudes more than an edge of the heat dissipation layer, and
  the edge of the heat dissipation layer protrudes more than an edge of the first waterproofing tape.

13. The electronic device of claim 5, wherein each of the first gasket and the second gasket is spaced from an edge of the support layer surrounded by the bending area.

14. The electronic device of claim 5, wherein each of the first gasket and the second gasket has a width increasing farther from the support layer.

15. The electronic device of claim 1, wherein
  the first panel area includes a folding area, a first unfolding area, and a second unfolding area, wherein
  the folding area is disposed between the first unfolding area and the second unfolding area, the folding area is foldable,
  the first waterproofing tape and the second waterproofing tape overlap the second unfolding area, and
  openings in the support layer are defined in a region overlapping the folding area of the support layer.

16. The electronic device of claim 1, wherein at least one of the first waterproofing tape and the second waterproofing tape includes a closed-cell foam.

17. An electronic device comprising:
a display panel;
a circuit film disposed on the display panel;
a first waterproofing tape disposed on the display panel and adjacent to the circuit film;
a second waterproofing tape disposed on the display panel and adjacent to the circuit film; and
a gasket disposed between the first waterproofing tape and the second waterproofing tape.

18. The electronic device of claim 17, wherein
the display panel includes:
a first panel area;
a bending area extending from the first panel area and bending toward a surface of the first panel area; and
a second panel area extending from the bending area and disposed under the first panel area,
the circuit film is attached to the second panel area, and
the second waterproofing tape overlaps the second panel area.

19. The electronic device of claim 18, further comprising:
a support layer disposed under the first panel area;
a spacer disposed under the support layer;
a panel protective layer disposed under the spacer; and
a chip cover layer disposed under the panel protective layer, wherein
the second panel area is disposed between the chip cover layer and the panel protective layer,
the second waterproofing tape is attached to the chip cover layer,
a first distance is defined between an edge of the spacer that contacts the gasket and the first waterproofing tape,
a second distance is defined between an edge of the panel protective layer that contacts the gasket and the first waterproofing tape,
a third distance is defined between an edge of the chip cover layer that contacts the gasket and the first waterproofing tape,
the first distance is smaller than the second and third distances, and
the second distance is smaller than the third distance.

20. The electronic device of claim 19, wherein at least one of the spacer, the first waterproofing tape, and the second waterproofing tape includes a closed-cell foam.

21. The electronic device of claim 17, wherein
the display panel includes a folding area, a first unfolding area, and a second unfolding area, wherein
the folding area is disposed between the first unfolding area and the second unfolding area,
the folding area is foldable, and
the first waterproofing tape, the second waterproofing tape, and
the gasket overlap the second unfolding area.

\* \* \* \* \*